US011257173B2

(12) United States Patent
Han et al.

(10) Patent No.: US 11,257,173 B2
(45) Date of Patent: Feb. 22, 2022

(54) COMPLEX ENERGY SYSTEM IN BIDIRECTIONAL ENERGY NETWORK AND CONTROL METHOD THEREOF

(71) Applicant: KOREA INSTITUTE OF ENERGY RESEARCH, Daejeon (KR)

(72) Inventors: Soo Bin Han, Daejeon (KR); Seaseung Oh, Seoul (KR); Su Yong Chae, Daejeon (KR); Jaejoon Choi, Daejeon (KR)

(73) Assignee: KOREA INSTITUTE OF ENERGY RESEARCH

( * ) Notice: Subject to any disclaimer, the term of this patent is extended or adjusted under 35 U.S.C. 154(b) by 1376 days.

(21) Appl. No.: 15/393,490

(22) Filed: Dec. 29, 2016

(65) Prior Publication Data

US 2018/0130143 A1    May 10, 2018

(30) Foreign Application Priority Data

Nov. 8, 2016  (KR) .......................... 10-2016-0147805

(51) Int. Cl.
  *G06Q 50/06*      (2012.01)
  *G06Q 10/06*      (2012.01)
  (Continued)

(52) U.S. Cl.
  CPC ....... *G06Q 50/06* (2013.01); *G06Q 10/06313* (2013.01); *G06Q 30/0283* (2013.01);
  (Continued)

(58) Field of Classification Search
  CPC ............. G06Q 50/06; G06Q 10/06313; G06Q 30/0283; Y02P 90/82; G05F 1/66; Y04S 50/14
  (Continued)

(56) References Cited

U.S. PATENT DOCUMENTS 8,626,344 B2    1/2014  Imes et al.
8,655,497 B2    2/2014  Campanile et al.
        (Continued)

FOREIGN PATENT DOCUMENTS

JP    2009189232 A  *  8/2009
KR   2010-0085563 A     7/2010
        (Continued)

OTHER PUBLICATIONS

Fubara, Techno-economic Modelling of Sustainable Engergy Future Scenarios with Natural Gas as a Transition Fuel to a Low Carbon Economy, Oct. 2016 (Year: 2016).*
(Continued)

*Primary Examiner* — Charles Guiliano
*Assistant Examiner* — Po Han Lee
(74) *Attorney, Agent, or Firm* — Harness, Dickey & Pierce, P.L.C.

(57) ABSTRACT

Provided is a control method of a complex energy system that supplies heat and power to energy consumers through a heat network and a power network. The control method includes monitoring energy consumption information of the energy consumers and confirming an energy price applied to each of the energy consumers, calculating a total energy consumption cost of the energy consumers according to the energy price and the energy consumption information, and controlling a cogenerator and a heat generator so that a sum of a power supply amount of the cogenerator and a power consumption amount from an external power grid is equal to a total power consumption amount of the energy consumers, a sum of a heat supply amount of the cogenerator and a heat supply amount of the heat generator is equal to a total heat consumption amount of the energy consumers, and a target function value obtained by subtracting the total energy consumption cost from a sum of a power consumption cost (Continued)

from the external power grid and operating costs of the cogenerator and the heat generator is maximized.

15 Claims, 10 Drawing Sheets

(51) Int. Cl.
 *G06Q 30/02* (2012.01)
 *G05F 1/66* (2006.01)
(52) U.S. Cl.
 CPC ............ *G05F 1/66* (2013.01); *Y02P 90/82* (2015.11); *Y04S 50/14* (2013.01)
(58) Field of Classification Search
 USPC ........................................................ 705/7.23
 See application file for complete search history.

(56) References Cited

U.S. PATENT DOCUMENTS

| | | |
|---|---|---|
| 9,112,411 B2 | 8/2015 | Chae et al. |
| 9,293,945 B2 | 3/2016 | Song et al. |
| 2007/0068162 A1 | 3/2007 | Komura et al. |
| 2015/0115891 A1 | 4/2015 | Sung et al. |
| 2015/0127180 A1 | 5/2015 | Oh et al. |
| 2015/0364982 A1 | 12/2015 | Chae et al. |
| 2016/0190933 A1 | 6/2016 | Lee et al. |
| 2016/0351042 A1 | 12/2016 | Chae et al. |

FOREIGN PATENT DOCUMENTS

| | | | |
|---|---|---|---|
| KR | 10-1324483 B1 | | 11/2013 |
| KR | 20140098369 A | * | 8/2014 |

OTHER PUBLICATIONS

Lopez, "Integration of energy from waste technologies within building developments: technical, environmental and economic considerations." Mar. 2010 (Year: 2010).*
"Integration of Cogeneration Systems into Smart Grids" to Schellong et al., Jul. 19, 2012 (Year: 2012).*
U.S. Appl. No. 15/296,513, filed Oct. 18, 2016, Jongbok Baek et al.

\* cited by examiner

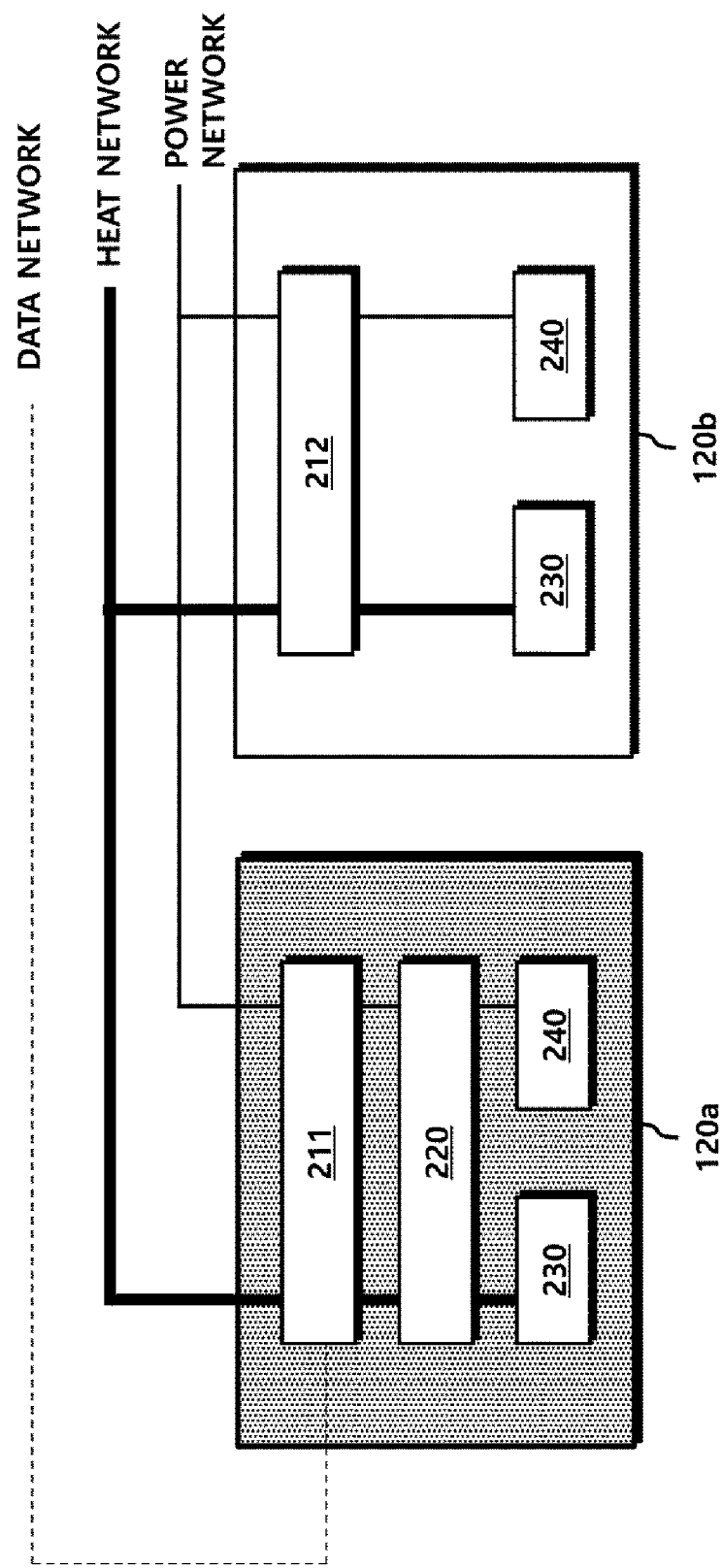

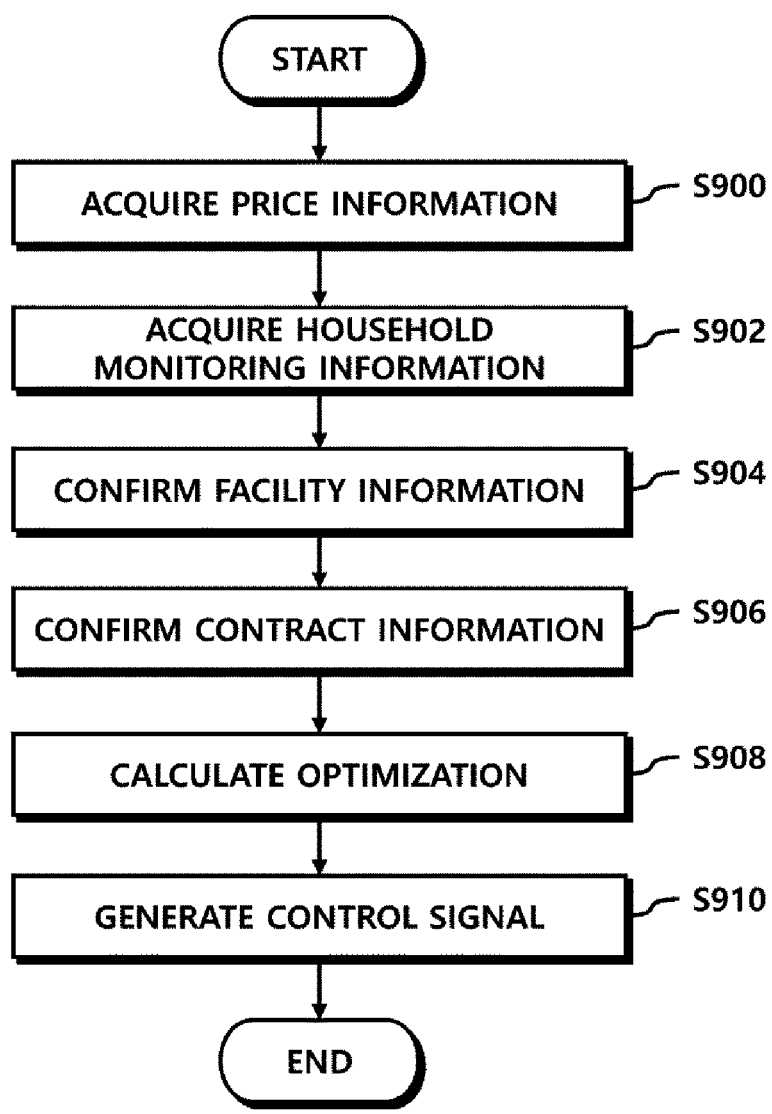

COMPLEX ENERGY SYSTEM IN BIDIRECTIONAL ENERGY NETWORK AND CONTROL METHOD THEREOF

CROSS-REFERENCE TO RELATED APPLICATIONS

This application claims priority from Korean Patent Application No. 10-2016-0147805 filed on Nov. 8, 2016, which is hereby incorporated by reference for all purposes as if fully set forth herein.

BACKGROUND OF THE INVENTION

Field of the Invention

The present invention relates to energy management technology, and more particularly, to a technology for integrated management of heat and power.

Description of the Related Art

In recent years, energy technology—especially, a technology for large power generation and central supply in terms of power supply—has difficulties due to environmental problems and residents' opposition to establishment of power plants and power transmission and transformation facilities. Accordingly, the paradigm of energy supply has been changed to distributed power generation. Furthermore, most countries including South Korea are increasing the proportion in which new renewable energy sources such as solar power and wind power are supplied, and thus the increased proportion accelerates the paradigm shift to distributed power generation.

Also, along with intelligent power networks, integrated energy management in which complex management is performed on heat networks and various fuels in consideration of local areas, wide areas, and even the entire country has been developed for a next-generation energy society such as a smart grid and a smart city.

The wide use of new renewable energy and information and communication technology (ICT) facilitates an era in which customers such as households hold energy sources that can produce power and heat, such as solar cells, fuel cells, and microturbines, and sell surplus energy to energy suppliers. Japan is institutionally ready and scheduled to liberalize the electricity retail business, followed by the United States.

A conventional building energy management system (BEMS) is a system for measuring and monitoring energy of a building to manage energy in the building. The BEMS can reduce energy by about 10% by managing illumination and air conditioning facilities and controlling peak power or the like of the facilities.

However, such a system independently manages and controls electricity and heat and also performs unidirectional energy management such that energy flows only in a direction from a supplier side to a consumer side. Thus, the management cannot be performed on bidirectional energy network systems.

A combined heat and power generation system (hereinafter referred to as a cogeneration system) is a system that supplies heat and power at the same time and may have higher energy efficiency than a system that individually supplies heat and power. However, the existing cogeneration systems allow only a unidirectional transaction, that is, can just supply heat and power to customers and do not allow a bidirectional transaction of energy with customers that hold energy sources.

SUMMARY OF THE INVENTION

The present invention is directed to providing a technology that enables an energy consumer and an energy supplier to make a bidirectional transaction of heat and power.

Also, the present invention is intended to provide a technology for managing and controlling energy when an energy supplier for supplying heat and power supplies energy to an energy consumer and the energy flows bidirectionally between the energy supplier and the energy consumer rather than unidirectionally from the energy supplier to the energy consumer, unlike the existing energy flow.

According to an aspect of the present invention, there is provided a control method of a complex energy system that supplies heat and power to energy consumers through a heat network and a power network. The control method includes monitoring energy consumption information of the energy consumers and confirming an energy price applied to each of the energy consumers; calculating a total energy consumption cost of the energy consumers according to the energy price and the energy consumption information; and controlling a cogenerator and a heat generator so that a sum of a power supply amount of the cogenerator and a power consumption amount from an external power grid is equal to a total power consumption amount of the energy consumers, a sum of a heat supply amount of the cogenerator and a heat supply amount of the heat generator is equal to a total heat consumption amount of the energy consumers, and a target function value obtained by subtracting the total energy consumption cost from a sum of the power consumption cost from the external power grid and operating costs of the cogenerator and the heat generator is maximized.

According to another aspect of the present invention, there is provided a complex energy system that supplies heat and power to energy consumers through a heat network and a power network. The complex energy system includes an energy consumer monitoring unit configured to monitor energy consumption information of the energy consumers; a price monitoring unit configured to confirm an energy price applied to each of the energy consumers and confirm a first fuel price of first fuel supplied to a cogenerator, a second fuel price of second fuel supplied to a heat generator, and a power consumption price from an external power grid; a total energy consumption cost calculation unit configured to calculate a total energy consumption cost of the energy consumers according to the energy price and the energy consumption information; and a control unit configured to control the cogenerator and the heat generator so that a sum of a power supply amount of the cogenerator and a power consumption amount from the external power grid is equal to a total power consumption amount of the energy consumers, a sum of a heat supply amount of the cogenerator and a heat supply amount of the heat generator is equal to a total heat consumption amount of the energy consumers, and a target function value obtained by subtracting the total energy consumption cost from a sum of the power consumption cost from the external power grid and operating costs of the cogenerator and the heat generator is maximized.

According to still another aspect of the present invention, there is provided a control method of a complex energy system that supplies heat and power to energy consumers through a heat network and a power network. The control method includes monitoring energy consumption information of the energy consumers and confirming an energy price applied to each of the energy consumers; calculating a total energy consumption cost of the energy consumers according to the energy price and the energy consumption information; and controlling a cogenerator and a heat generator so that a sum of a power supply amount of the cogenerator and a power consumption amount from an external power grid is equal to a total power consumption amount of the energy consumers, a sum of a heat supply amount of the cogenerator, a heat supply amount of the heat generator, and a heat consumption amount from an external heat network is equal to a total heat consumption amount of the energy consumers, and a target function value obtained by subtracting the total energy consumption cost from the sum of a power consumption cost from the external power grid, the heat consumption cost from the external heat network, and operating costs of the cogenerator and the heat generator is maximized.

As described above, according to an embodiment of the present invention, the energy consumer and the energy supplier can make a bidirectional transaction of heat and power. Also, according to an embodiment of the present invention, when an energy supplier for supplying heat (including cooling and heating) and power supplies energy to an energy consumer, the energy can flow bidirectionally between the energy supplier and the energy consumer rather than unidirectionally from the energy supplier to the energy consumer, unlike the existing energy flow.

Also, according to an embodiment of the present invention, over an energy network through which energy flows bidirectionally, an energy supplier can flexibly perform an operation of supplying heat and power in consideration of heat and power produced by energy consumers. In this case, a solution of purchasing the heat and power of the energy consumers can also be included.

Also, according to an embodiment of the present invention, an energy supplier can supply energy such that a gain is obtainable from the energy supplier according to a format required by an energy user of an energy consumer in complex connection with power, heat, fuel, and demand information.

BRIEF DESCRIPTION OF THE DRAWINGS

The above and other aspects, features and other advantages of the present invention will be more clearly understood from the following detailed description taken in conjunction with the accompanying drawings, in which:

FIG. 2 is a block diagram of an energy consumer according to an embodiment;

FIG. 9 is a flowchart of an energy management method according to another embodiment.

DETAILED DESCRIPTION OF THE EMBODIMENT

Figure 1:
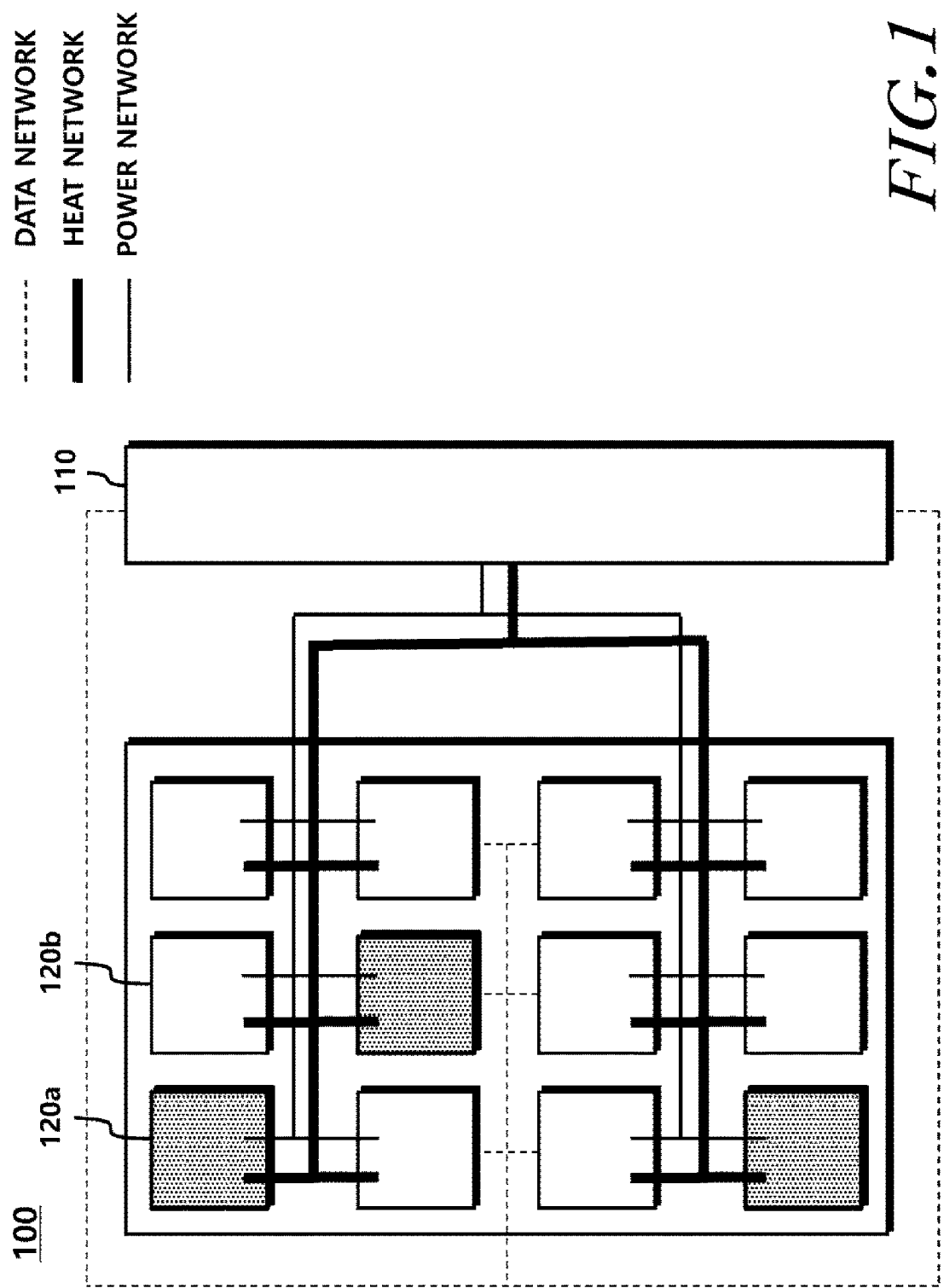
FIG. 1 is a block diagram showing a complex energy system according to an embodiment of the present invention.

Hereinafter, embodiments of the present invention will be described in detail with reference to the accompanying drawings. In adding reference numerals for elements in each figure, it should be noted that like reference numerals are used to denote like elements in other figures wherever possible. Moreover, detailed descriptions related to well-known functions or configurations will be omitted so as not to unnecessarily obscure the subject matter of the present invention.

In addition, terms such as first, second, A, B, (a), (b) or the like may be used herein when describing elements of the present invention. These terms are merely used to distinguish one structural element from other structural elements, and a property, an order, a sequence and the like of a corresponding structural element are not limited by the term. It should be noted that if it is described in the specification that one element is "connected," "combined" or "coupled" to another element, a third element may be "connected," "combined," and "coupled" between the first and second elements, although the first element may be directly connected, coupled or joined to the second element.

FIG. 1 is a block diagram showing a complex energy system according to an embodiment of the present invention.

Referring to FIG. 1, a complex energy system 100 may include a plurality of energy consumers 120a and 120b and a complex energy supply apparatus 110.

The plurality of energy consumers 120a and 120b and the complex energy supply apparatus 110 may be connected over a heat network, a power network, and a data network.

The heat network provides a path through which heat flows, and heat produced by the complex energy supply apparatus 110 may be supplied to the energy consumers 120a and 120b over the heat network.

The power network provides a path through which power flows, and power produced by the complex energy supply apparatus 110 may be supplied to the energy consumers 120a and 120b over the power network.

In the complex energy system 100 according to an embodiment, the energy consumer 120a (hereinafter also referred to as energy producer-consumer 120a), in addition to the complex energy supply apparatus 110, may supply heat and power.

The energy consumers 120a and 120b may include the energy producer-consumer 120a that may produce heat and power. The energy producer-consumer 120a may supply heat produced in its own house to the heat network and may supply power produced in its own house to the power network. It will be appreciated that the energy producer-consumer 120a may internally use the heat produced in its own house and may internally use the power produced in its own house.

By supplying heat and power of the energy producer-consumer 120a, the heat may flow bidirectionally over the heat network, and the power may flow bidirectionally over the power network. Here, the term "bidirectional" refers to functioning in two directions between the energy producer-consumer 120a and the energy consumer 120b or the complex energy supply apparatus 110.

In detail, the heat produced by the energy producer-consumer 120a may flow to the complex energy supply apparatus 110 over the heat network, and conversely the heat produced by the complex energy supply apparatus 110 may flow to the energy producer-consumer 120*a*. Also, the power produced by the energy producer-consumer 120*a* may flow to the complex energy supply apparatus 110 over the power network, and conversely the power produced by the complex energy supply apparatus 110 may flow to the energy producer-consumer 120*a*.

On the other hand, the heat produced by the energy producer-consumer 120*a* may also be supplied to the energy consumer 120*b*. Also, the power produced by the energy producer-consumer 120*a* may also be supplied to the energy consumer 120*b*.

The energy consumers 120*a* and 120*b* and the complex energy supply apparatus 110 may be connected over the data network. In the data network, information may be transmitted or received bidirectionally.

The energy consumers 120*a* and 120*b* may transmit energy consumption information including a heat usage amount, a heat production amount, a power usage amount, and a power production amount to the complex energy supply apparatus 110 over the data network.

Conversely, the complex energy supply apparatus 110 may transmit a control command (e.g., a demand response command) to the energy consumers 120*a* and 120*b* over the data network and may transmit additional information, for example, information regarding all of the energy consumers 120*a* and 120*b* or billing information for each energy consumer to the energy consumers 120*a* and 120*b*.

A meter for measuring heat and power may be installed in each of the energy consumers 120*a* and 120*b*. The meter may measure heat usage amount, a heat production amount, a power usage amount, and a power production amount in each of the energy consumers 120*a* and 120*b* and may transmit the measured information to the complex energy supply apparatus 110.

The energy producer-consumer 120*a* may include a production meter that may measure a heat production amount and a power production amount as well as a heat usage amount and a power usage amount. The production meter may measure heat and power produced by the energy producer-consumer 120*a*, generate heat production information and power production information, and transmit the information to the complex energy supply apparatus 110 over the data network.

When a format of data transmitted from the energy consumers 120*a* and 120*b* to the complex energy supply apparatus 110 is fixed, the general energy consumer 120*b* that does not have an energy production apparatus may set values of a heat production amount and a power production amount as 0 and perform data transmission.

The complex energy supply apparatus 110 may calculate a heat production amount and a power production amount on the basis of a power usage amount, a power production amount, heat usage amount, and a heat production amount of the energy consumers 120*a* and 120*b* that are received from the energy consumers 120*a* and 120*b*. The complex energy supply apparatus 110 may operate a cogenerator or a heat generator on the basis of the calculated heat production amount and power production amount.

FIG. 2 is a block diagram of an energy consumer according to an embodiment.

Referring to FIG. 2, the energy consumers 120*a* and 120*b* may be classified into the energy producer-consumer 120*a* that may produce heat and power and the general energy consumer 120*b*.

The general energy consumer 120*b* may include a general meter 212, a heat load 230, and a power load 240.

The heat load 230 is a load that consumes heat, and representative examples of the heat load 230 include a heating apparatus and an apparatus that uses hot water. The heat load 230 is connected to a heat network through the general meter 212, and the general meter 212 may measure the amount of heat supplied from the heat network.

The power load 240 is a load that consumes power, and a representative example of the power load 240 is an electronic device. The power load 240 is connected to a power network through the general meter 212, and the general meter 212 may measure the amount of power supplied from the power network.

The heat measurement and the power measurement may be separately performed. Thus, the general meter 212 may separately include a heat energy meter that measures heat and a watt-hour meter that measures power.

The energy producer-consumer 120*a* may include a production meter 211, a complex private power generator 220, a heat load 230, and a power load 240.

The heat load 230 and the power load 240 may be the same as the heat load 230 and the power load 240 of the general energy consumer 120*b*, respectively.

The energy producer-consumer 120*a* may further include the complex private power generator 220, unlike the general energy consumer 120*b*. The complex private power generator 220 may be an apparatus that may produce both heat and power.

The complex private power generator 220 may be connected to the heat network and the power network through the production meter 211.

The amount of heat and power produced by the complex private power generator 220 may be measured by the production meter 211. Also, information regarding the measured heat production amount and power production amount may be transmitted to the complex energy supply apparatus 110 over a data network.

The complex private power generator 220 may be internally connected with the heat load 230 and the power load 240 to directly supply heat and power to the heat load 230 and the power load 240. However, even in this case, the production meter 211 may measure heat and power produced by the complex private power generator 220.

Figure 3A:
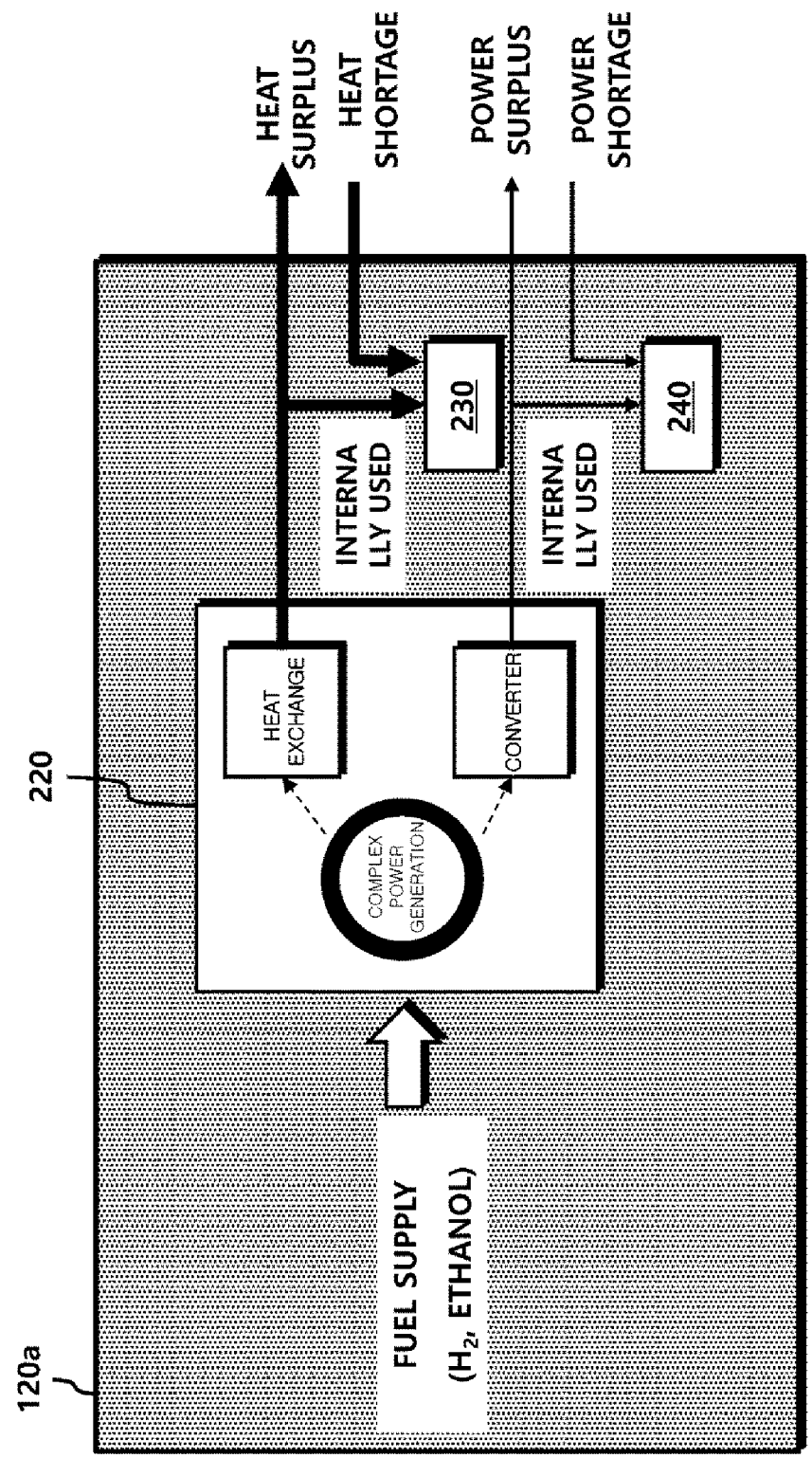
FIGS. 3A and 3B are energy flow diagrams of an energy producer-consumer according to an embodiment.
Figure 3B:
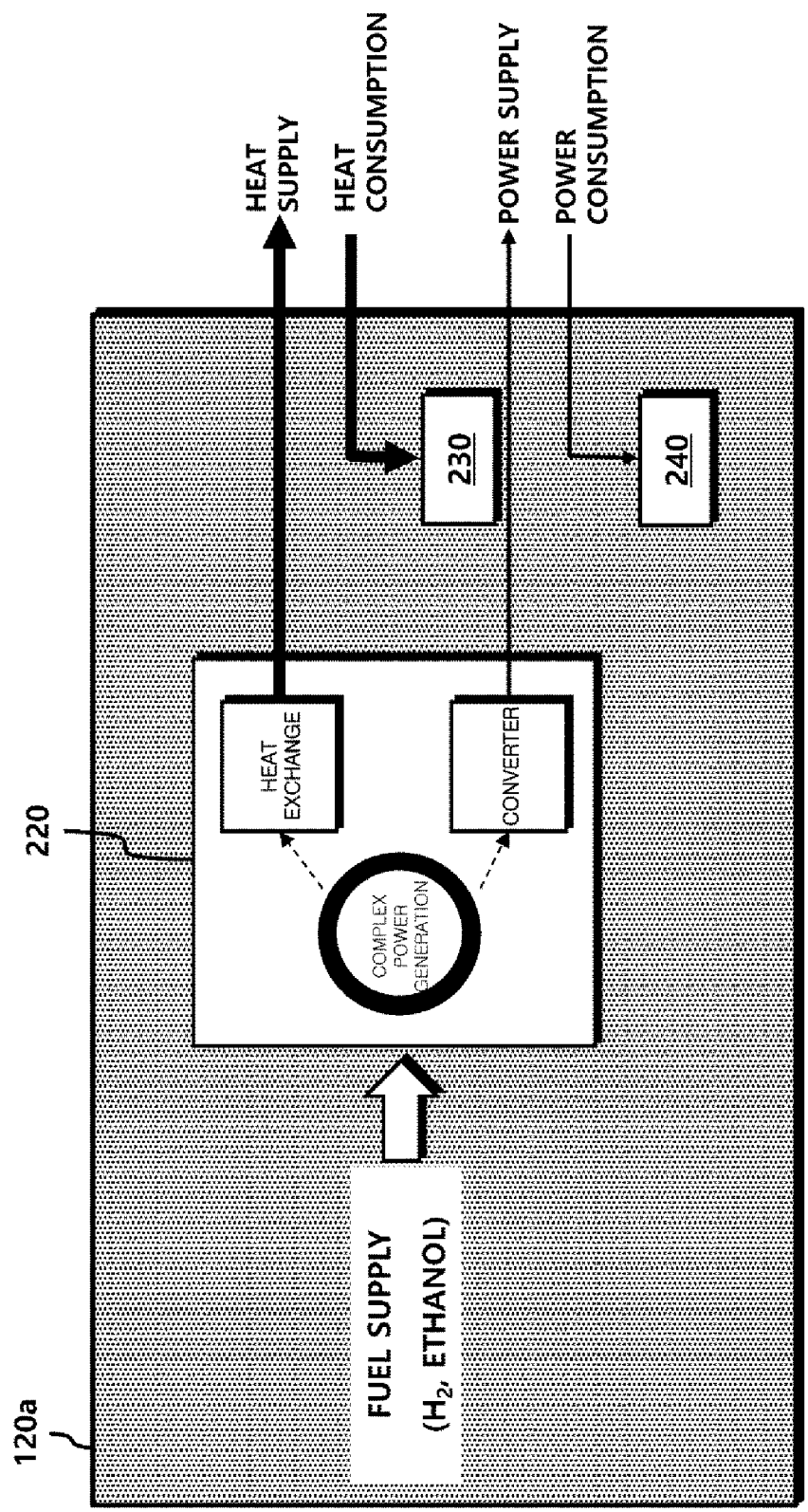

FIGS. 3A and 3B are energy flow diagrams of an energy producer-consumer according to an embodiment.

A complex private power generator 220 is a power generator that may produce both heat and power, and a representative example of the complex private power generator 220 includes a solar power generator, a microturbine, a fuel cell, etc. An example of an energy producer-consumer 120*a* that is using a fuel cell as the complex private power generator 220 is shown in FIG. 3A.

When a fuel (e.g., H2, ethanol, etc.) is supplied to the fuel cell, power generation is achieved in a fuel cell stack to produce power. However, the fuel cell may also emit heat while the power generation is achieved in the stack, and the complex private power generator 220 may use the heat.

In detail, the power produced through the power generation is output through a converter so that the power may be converted to be suitable for a power state of the power network. The heat produced during the power generation is output through a heat exchanger so that the heat may be suitable for a heat utilization type of the heat network.

The heat and power produced by the complex private power generator 220 may be internally used.

Referring to FIG. 3A, the heat produced by the complex private power generator 220 may be supplied to the heat load 230. In this case, when the heat production amount of the complex private power generator 220 is greater than a heat usage amount of the heat load 230, surplus heat is generated. Such surplus heat may flow out over the heat network.

On the other hand, when the heat production amount of the complex private power generator 220 is less than a heat usage amount of the heat load 230, heat corresponding to the shortage may be transferred to the heat load 230 over the heat network.

The power may flow in a similar way to the heat. Referring to FIG. 3A, the power produced by the complex private power generator 220 may be supplied to the power load 240. In this case, when the power production amount of the complex private power generator 220 is greater than a power usage amount of the power load 240, surplus power is generated. Such surplus power may flow out over the power network.

On the other hand, when the power production amount of the complex private power generator 220 is less than a power usage amount of the power load 240, power corresponding to the shortage may be transferred to the power load 240 over the power network.

Among the energy consumers 120a and 120b, the energy producer-consumer 120a that may produce heat and power is included, and thus the complex energy supply apparatus 110 may produce heat and power in consideration of the amount of heat and power produced by the energy producer-consumer 120a.

For example, the complex energy supply apparatus 110 may produce only as much as a remaining amount of heat obtained by subtracting the amount of heat produced by the energy producer-consumer 120a. Also, the complex energy supply apparatus 110 may produce only as much as a remaining amount of power obtained by subtracting the amount of power produced by the energy producer-consumer 120a.

Meanwhile, the heat and power produced by the complex private power generator 220 may be directly supplied to the heat network and power network outside the complex private power generator 220.

Referring to FIG. 3B, the heat produced by the complex private power generator 220 may flow out over the heat network. Also, the heat load 230 may be resupplied with heat from the heat network again.

The power may flow in a similar way to the heat. Referring to FIG. 3B, the power produced by the complex private power generator 220 may be supplied to the power network, and the power load 240 may be supplied with power from the power network again.

Embodiments of FIGS. 3A and 3B may be implemented in a mixed form. For example, the produced heat may be internally used by the heat load 230 first, and the produced power may be supplied to the power network first.

Figure 4:
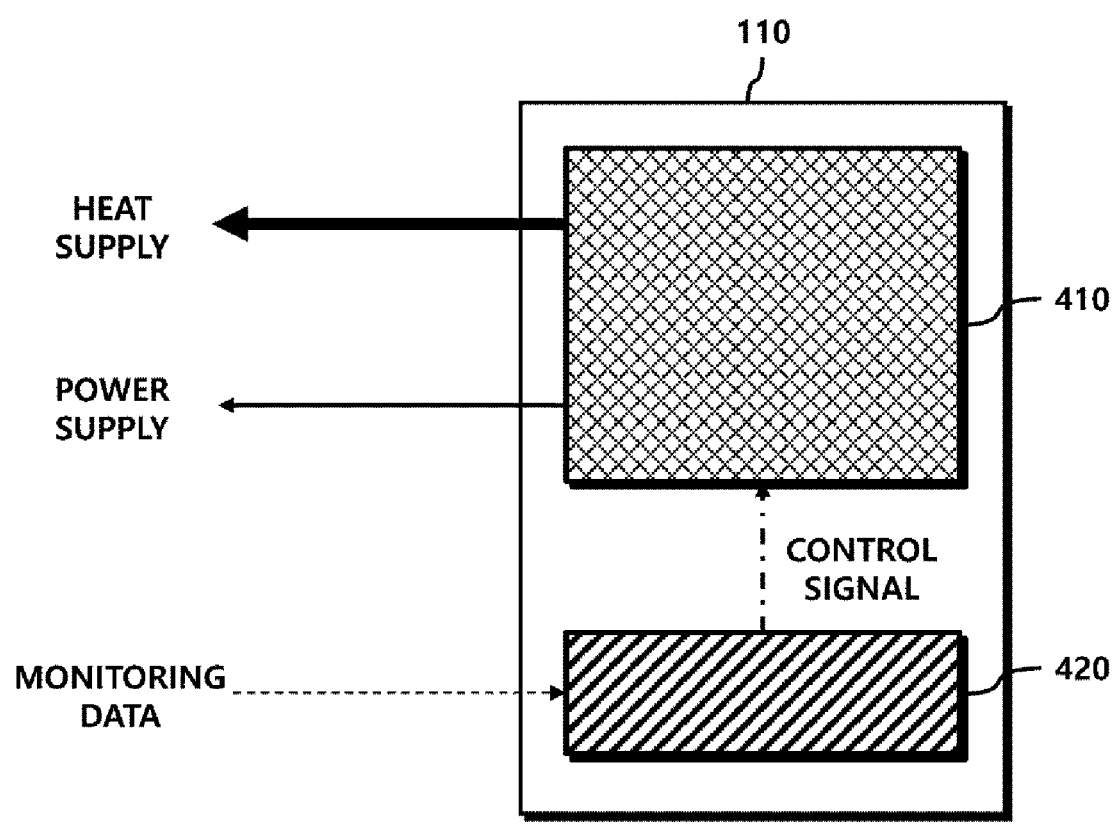
FIG. 4 is a block diagram of a complex energy supply apparatus according to an embodiment.

FIG. 4 is a block diagram of a complex energy supply apparatus according to an embodiment.

Referring to FIG. 4, the complex energy supply apparatus 110 may include an energy production apparatus 410 and an energy management apparatus 420.

The energy production apparatus 410 is an apparatus that produces heat and power, and the produced heat and power are supplied to the energy consumers 120a and 120b over the heat network and the power network.

The energy management apparatus 420 is an apparatus that generates a control signal for the energy production apparatus 410, and may receive monitoring data from the energy consumers 120a and 120b, generate a control signal on the basis of the monitoring data, and then transmit the control signal to the energy production apparatus 410.

The energy management apparatus 420 may be equipped with an energy management algorithm and may calculate a heat production amount and a power production amount using the energy management algorithm and generate a control signal for controlling the energy production apparatus 410 according to the calculated heat production amount and power production amount.

Figure 5:
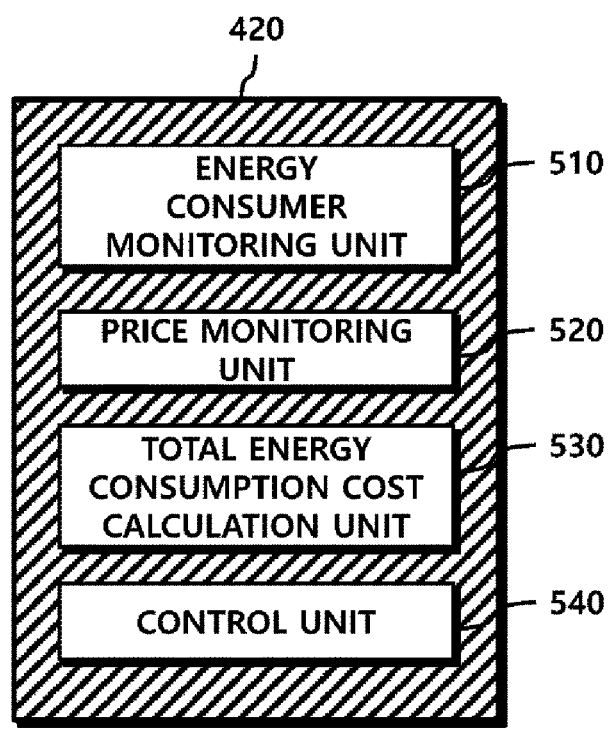
FIG. 5 is a block diagram of an energy management apparatus according to an embodiment.

FIG. 5 is a block diagram of an energy management apparatus according to an embodiment.

Referring to FIG. 5, the energy management apparatus 420 may include an energy consumer monitoring unit 510, a price monitoring unit 520, a total energy consumption cost calculation unit 530, and a control unit 540.

The energy consumer monitoring unit 510 may monitor energy consumption information for each energy consumer.

The energy consumption information may include information regarding a heat usage amount, a heat production amount, a power usage amount, and a power production amount of each energy consumer. A meter for distinguishing and measuring the heat usage amount, the heat production amount, the power usage amount, and the power production amount may be installed in each of the energy consumers, and the energy consumer monitoring unit 510 may acquire energy consumption information for each energy consumer from the meter.

The price monitoring unit 520 may confirm an energy price applied to each energy consumer. The energy price may separately include a price for the heat usage amount, a price for the heat production amount, a price for the power usage amount, and a price for the power production amount. For example, different prices may be applied to the same heat usage amount and the same heat production amount.

At a specific time, the energy prices applied to the energy consumers may be different from each other.

As an example, an energy supplier, i.e., an energy supplier that operates a complex energy supply apparatus may enter into different price agreements with the energy consumers. The energy supplier may enter into different price agreements depending on an energy usage scale of the energy consumer. The energy consumer may be a single energy customer or include a plurality of energy customers. The energy usage scale of the energy consumer may vary depending on the number of energy customers included in the energy consumer. The energy supplier may agree to a different price depending on the energy usage scale of the energy consumer. An energy consumer that manages a plurality of energy customers may be a business operator that is supplied with energy from the energy supplier and resells the energy to the plurality of energy customers. In this case, the energy consumer may create its own profit by implementing an independent energy pricing policy for each of the plurality of energy customers.

As another example, the energy price may be set for each energy consumer by using the same pricing policy (price contract), and the pricing policy may be to change the prices depending on energy consumption amounts of the energy consumers. As a detailed example, the energy price may have a form of a progressive stage system. In this case, although the same pricing policy is applied to the energy consumers, different energy prices may be applied depending on the energy consumption amount at a specific time.

The price monitoring unit 520 may also confirm a price of fuel supplied to the energy production apparatus 410. The energy production apparatus 410 may include a cogenerator or a heat generator (e.g., a boiler), and the price monitoring unit 520 may confirm a first fuel price of first fuel supplied to the cogenerator and a second fuel price of second fuel supplied to the heat generator. When the cogenerator and the heat generator use the same fuel, e.g., gas, the price monitoring unit 520 may also confirm only one fuel price.

The price monitoring unit 520 may also confirm a power consumption price with respect to an external power grid. When all of the demands of the energy consumers are not met through self-power generation, the complex energy supply apparatus may be supplied with power from the external power grid and transfer the power to the energy consumers. In this case, the price monitoring unit 520 may confirm a price of the power supplied from the external power grid. The price of the power supplied from the external power grid may vary in real time. The power price may vary depending on a time-based system marginal price (SMP). Information regarding the SMP may be acquired from a server that manages the external power grid.

The power consumption price with respect to the external power grid may separately include a price of power supplied from the external power grid (hereinafter referred to as an external power grid power consumption price) and a price of power reversely supplied to the external power grid (hereinafter referred to as an external power grid power reverse-supply price). The complex energy supply apparatus may supply the remaining power to the external power grid after all demands of the energy consumers are satisfied. In this case, the external power grid power reverse-supply price is applied.

The external power grid power consumption price and the external power grid power reverse-supply price may be differently managed. Also, a price for a power usage amount of the energy consumer (hereinafter referred to as an energy consumer power consumption price) and a price for a power production amount of the energy consumer (hereinafter referred to as an energy consumer power reverse-supply price) may be differently managed. The energy supplier may have a business form in which power produced by the energy consumer is purchased and resold to the external power grid. Here, the energy consumer power reverse-supply price may be set to be lower than the external power grid power reverse-supply price.

The total energy consumption cost calculation unit 530 may calculate an energy consumption cost for each energy consumer on the basis of energy prices and energy consumption information applied to the energy consumers. Also, the total energy consumption cost calculation unit 530 may calculate a total energy consumption cost by summing all energy consumption costs of the energy consumers.

The control unit 540 may control a power supply amount of the energy production apparatus so that the sum of a power supply amount of the energy production apparatus and a power consumption amount from the external power grid is equal to the total power consumption amount of the energy consumers. Also, the control unit 540 may control a heat supply amount of the energy production apparatus so that the heat supply amount of the energy production apparatus is equal to a total heat consumption amount of the energy consumers. Also, the control unit 540 may control the energy production apparatus so that a target function value obtained by subtracting the total energy consumption cost from the sum of an operating cost of the energy production apparatus and a power consumption cost originating from the external power grid is maximized.

For example, in order to satisfy the total power consumption amount of the energy consumers, the control unit 540 may increase the power supply amount of the energy production apparatus and increase the power consumption amount from the external power grid. In this case, the control unit 540 may control the energy production apparatus such that its cost decreases while its profit increases.

Figure 6:
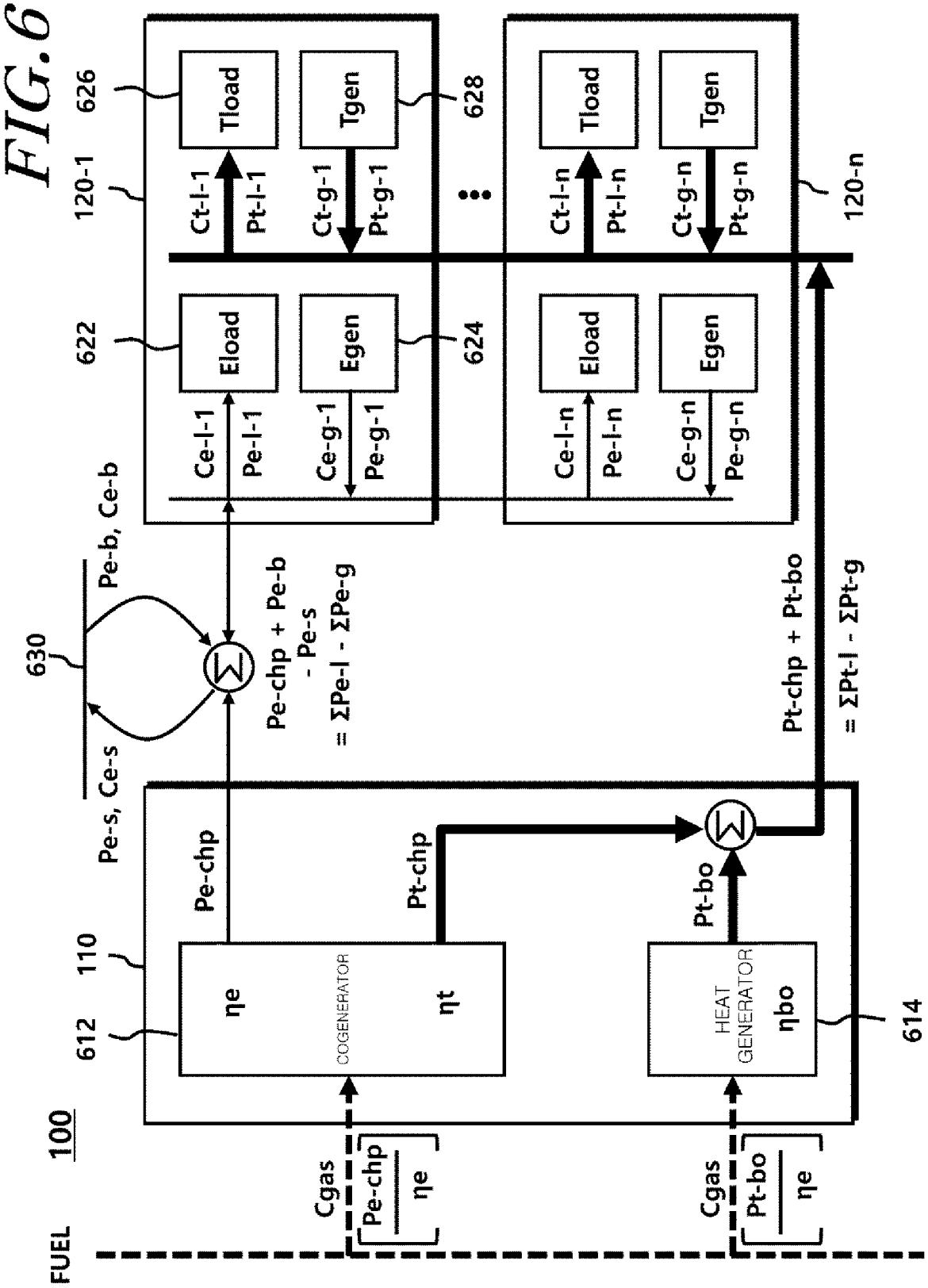
FIG. 6 is a diagram showing a flow and a cost of energy according to an embodiment.

FIG. 6 is a diagram showing a flow and a cost of energy according to an embodiment.

Referring to FIG. 6, the complex energy supply apparatus 110 may include a cogenerator 612 and a heat generator 614 as energy production apparatuses. An example of the heat generator 614 may be a boiler.

The cogenerator 612 may include a combustion-type heat and power generator using a steam turbine, a gas engine or the like and a chemical-conversion-type heat and power generator such as a fuel cell.

The cogenerator 612 and the heat generator 614 may use natural gas as fuel. The cogenerator 612 may generate power equal to a cogenerator power supply amount Pe-chp by using natural gas as primary energy. Here, assuming that power generation efficiency of the cogenerator 612 with respect to gas energy is $\eta e$, a gas energy amount used for power generation is Pe-chp/$\eta e$.

Considering a price Cgas of fuel (e.g., natural gas) supplied to the cogenerator 612, a power generation cost used by the cogenerator 612 to generate the power equal to the cogenerator power supply amount Pe-chp may be calculated by dividing the cogenerator power supply amount Pe-chp by the power generation efficiency $\eta e$ and multiplying the quotient by the fuel price Cgas.

An operating cost of the cogenerator 612 may include other components, but mainly includes the power generation cost Cgas*Pe-chp/$\eta e$.

An amount of power that cannot be covered with the cogenerator power supply amount Pe-chp may be supplied from an external power grid 630. When the power amount supplied from the external power grid 630 is an external power grid power consumption amount Pe-b, the complex energy system 100 may be supplied with the external power grid power consumption amount Pe-b from the external power grid 630 at an external power grid power consumption price Ce-b and may supply the external power grid power consumption amount Pe-b to energy consumers 120-1, . . . , 120-n.

When a power supply amount is greater than a power usage amount in the complex energy system 100, surplus power of the complex energy system 100 may be reversely supplied to the external power grid 630. Assuming that the power amount reversely supplied to the external power grid 630 is an external power grid power reverse-supply amount Pe-s, the complex energy system 100 may reversely supply the external power grid power reverse-supply amount Pe-s to the external power grid 630 at an external power grid power reverse-supply price Ce-s.

The heat generator 614 may produce a heat generator heat supply amount Pt-bo by using natural gas as fuel. Here, assuming that heat production efficiency of the heat generator 614 with respect to gas energy is $\eta bo$, a gas energy amount used for heat production is Pt-bo/$\eta bo$.

Considering a price Cgs of fuel (e.g., natural gas) supplied to the heat generator 614, a heat production cost used by the heat generator 614 to produce the heat generator heat supply amount Pt-bo may be calculated by dividing the heat generator heat supply amount Pt-bo by the heat production efficiency $\eta bo$ and multiplying the quotient by the fuel price Cgas.

An operating cost of the heat generator 614 may include other elements, but mainly includes the heat production cost Cgas*Pt–bo/ηbo.

The complex energy system 100 may include a plurality of energy consumers 120-1, . . . , 120-n. The energy consumers 120-1, . . . , 120-n may be the same type or different types. As an example, the energy consumers 120-1, . . . , 120-n may be households in the same apartment building. As another example, the energy consumers 120-1, . . . , 120-n may be different types, for example, an apartment household, a detached house household, a building, or a factory. As still another example, the energy consumers 120-1, . . . , 120-n may be small complex energy systems (or complex energy suppliers).

Each of the energy consumers 120-1, . . . , 120-n may have a power load 622 and a heat load 626 and consume energy. Also, each of the energy consumers 120-1, . . . , 120-n may include a power production apparatus 624 and a heat generator 628. Also, some of the energy consumers 120-1, . . . , 120-n may not include the power production apparatus 624 and the heat generator 628. In this case, a power production amount of the power production apparatus 624 may be regarded as 0, or a heat production amount of the heat generator 628 may be regarded as 0.

For an $N^{th}$ energy consumer 120-n (n is a natural number), a price for a power usage amount (hereinafter referred to as an energy consumer power consumption price) is Ce-l-n, a price for a power production amount (hereinafter referred to as an energy consumer power reverse-supply price) is Ce-g-n, a price for a heat usage amount (hereinafter referred to as an energy consumer heat consumption price) is Ct-l-n, and a price for a heat production amount (hereinafter referred to as an energy consumer heat reverse-supply price) is Ct-g-n. Also, an energy consumer power usage amount, an energy consumer power production amount, an energy consumer heat usage amount, and an energy consumer heat production amount that are monitored through a meter of the $N^{th}$ energy consumer 120-n (n is a natural number) are Pe-l-n, Pe-g-n, Pt-l-n, and Pt-g-n, respectively.

In this case, an energy consumption cost Fpro-n of the $N^{th}$ energy consumer 120-n may be calculated using Equation (1).

$$F\text{pro-}n = (Ce\text{-}l\text{-}n)\cdot(Pe\text{-}l\text{-}n) - (Ce\text{-}g\text{-}n)\cdot(Pe\text{-}g\text{-}n) + (Ct\text{-}l\text{-}n)\cdot(Pt\text{-}l\text{-}n) - (Ct\text{-}g\text{-}n)\cdot(Pt\text{-}g\text{-}n) \quad \text{[Equation (1)]}$$

In Equation (1), the energy costs Ce-l-n, Ce-g-n, Ct-l-n, and Ct-g-n may have different values for each of the energy consumers 120-1, . . . , 120-n. For example, Ce-l-1 may not be equal to Ce-l-n. The energy costs of the energy consumers 120-1, . . . , 120-n to which the same pricing policy is applied may vary depending on a progressive stage system, etc. Also, when the energy consumers 120-1, . . . , 120-n are different types, for example, an apartment, a detached house, a building, and a factory, different pricing policies (price contracts) may be applied, and thus the energy prices thereof may also vary. Also, for the same energy consumers 120-1, . . . , 120-n, the energy consumer power consumption price may be different from the energy consumer power reverse-supply price. For example, Ce-l-n may not be equal to Ce-g-n. For new renewable energy, the energy consumer power consumption price may be different from the energy consumer power reverse-supply price because compensation for power production is different depending on a policy. In this context, the energy consumer heat consumption price may also be different from the energy consumer heat reverse-supply price.

A total energy consumption cost Fpro-all may be calculated by summing all energy consumption costs of the energy consumers 120-1, . . . , 120-n using Equation (2).

$$F\text{pro-all} = \sum_{i=1}^{n}(F\text{pro-}i) = \quad \text{[Equation (2)]}$$

$$\sum_{i=1}^{n}[(Ce\text{-}l\text{-}i)\cdot(Pe\text{-}l\text{-}i) - (Ce\text{-}g\text{-}i)\cdot(Pe\text{-}g\text{-}i) + (Ct\text{-}l\text{-}i)\cdot(Pt\text{-}l\text{-}i) - (Ct\text{-}g\text{-}i)\cdot(Pt\text{-}g\text{-}i)]$$

A supply cost Fsup that is used by an energy supplier may be calculated by summing a power consumption cost from the external power grid 630 and operating costs of the cogenerator 612 and the heat generator 614. For simplification of the calculation, the operating cost of the cogenerator 612 is replaced with a power generation cost, and the operating cost of the heat generator 614 may be replaced with a heat production cost. In this case, the supply cost Fsup that is used by the energy supplier may be calculated using Equation (3).

$$F\text{sup} = C\text{gas}\left(\frac{Pe\text{-}chp}{\eta e}\right) + \quad \text{[Equation (3)]}$$

$$C\text{gas}\left(\frac{Pt\text{-}bo}{\eta bo}\right) + (Ce\text{-}b\cdot Pe\text{-}b) - (Ce\text{-}s\cdot Pe\text{-}s)$$

In the related art, control was performed to minimize the supply cost Fsup that is used by the energy supplier. However, there is a need for an optimization solution that is different from the related art by considering that the energy consumers 120-1, . . . , 120-n may reversely supply power and heat over the energy network and different energy prices are applied to the energy consumers 120-1, . . . , 120-n.

Actually, an economically optimal operation of the energy supplier maximizes a target function value Max[Fpro-all–Fsup] obtained by subtracting the supply cost Fsup from the total energy consumption cost Fpro-all. Thus, in this embodiment, the target function value Max[Fpro-all–Fsup] is calculated using Equation (4).

$$\text{Max}\{(F\text{pro-all}) - (F\text{sup})\} = \quad \text{[Equation (4)]}$$

$$\text{Max}\left\{\sum_{i=1}^{n}[(Ce\text{-}l\text{-}i)\cdot(Pe\text{-}l\text{-}i) - (Ce\text{-}g\text{-}i)\cdot(Pe\text{-}g\text{-}i) + (Ct\text{-}l\text{-}i)\cdot(Pt\text{-}l\text{-}i) - (Ct\text{-}g\text{-}i)\cdot(Pt\text{-}g\text{-}i)] - \left[C\text{gas}\left(\frac{Pe\text{-}chp}{\eta e}\right) + C\text{gas}\left(\frac{Pt\text{-}bo}{\eta bo}\right) + (Ce\text{-}b\cdot Pe\text{-}b) - (Ce\text{-}s\cdot Pe\text{-}s)\right]\right\}$$

Equation (4) may have restrictive conditions. A first restrictive condition is that the power supply amount of the energy supplier is equal to the total power consumption amount of the energy consumers 120-1, . . . , 120-n. As a detailed example, the sum of the power supply amount of the cogenerator 612 and the power consumption amount from the external power grid 630 may be equal to the total power consumption amount of the energy consumers 120-1, . . . , 120-n.

$$(Pe\text{-}chp) + (Pe\text{-}b) - (Pe\text{-}s) = \sum_{i=1}^{n}(Pe\text{-}l\text{-}i) - \sum_{i=1}^{n}(Pe\text{-}g\text{-}i) \quad \text{[Equation (5)]}$$

Also, a second restrictive condition is that the heat supply amount of the energy supplier is equal to the total heat consumption amount of the energy consumers 120-1, ..., 120-n. As a detailed example, the sum of the heat supply amount of the cogenerator 612 and the heat supply amount of the heat generator 614 may be equal to the total heat consumption amount of the energy consumers 120-1, ..., 120-n.

$$(Pt\text{-}chp) + (Pt\text{-}bo) = \sum_{i=1}^{n}(Pt\text{-}l\text{-}i) - \sum_{i=1}^{n}(Pt\text{-}g\text{-}i) \quad \text{[Equation (6)]}$$

Under the first restrictive condition and the second restrictive condition, the complex energy system 100 may control the cogenerator 612 and the heat generator 614 so that a target function value obtained by subtracting the total energy consumption cost from the sum of the power consumption cost from the external power grid 630 and the operating costs of the cogenerator 612 and the heat generator 614. Optimization of the target function value may be performed by a control unit. The control unit may generate control values of the cogenerator 612 and the heat generator 614 at regular intervals of 5 minutes or less.

Figure 7:
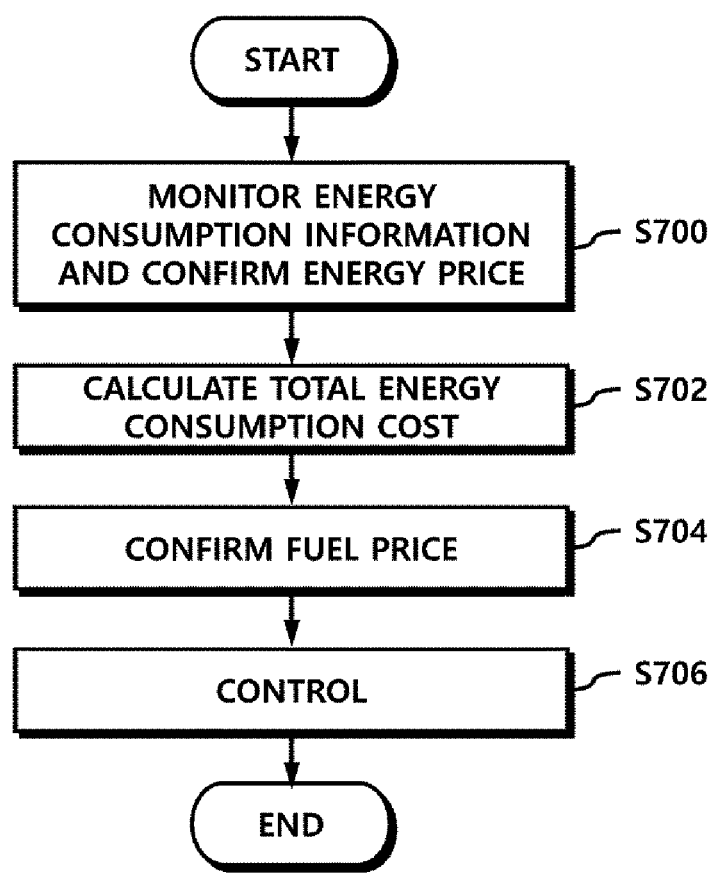
FIG. 7 is a flowchart of a method of controlling a complex energy system according to an embodiment.

FIG. 7 is a flowchart of a method of controlling a complex energy system according to an embodiment.

Referring to FIG. 7, a complex energy system may monitor energy consumption information for each energy consumer and may confirm an energy price applied to each energy consumer (S700). The energy consumption information may include information regarding a heat usage amount, a heat production amount, a power usage amount, and a power production amount of the energy consumer, and the energy price may separately include a price for the heat usage amount, a price for the heat production amount, a price for the power usage amount, and a price for the power production amount. Also, the energy price may be set for each energy consumer by using the same pricing policy, and the pricing policy may be to change the prices depending on energy consumption amounts of the energy consumers.

Also, the complex energy system may calculate a total energy consumption cost for the energy consumers according to the energy price and the energy consumption information (S702).

Also, the complex energy system may confirm a first fuel price of first fuel supplied to a cogenerator and a second fuel price of second fuel supplied to a heat generator (S704).

Also, the complex energy system may control the cogenerator and the heat generator so that the sum of a power supply amount of the cogenerator and a power consumption amount from an external power grid is equal to a total power consumption amount of the energy consumers, the sum of a heat supply amount of the cogenerator and a heat supply amount of the heat generator is equal to a total heat consumption amount of the energy consumers, and a target function value obtained by subtracting the total energy consumption cost from the sum of a power consumption cost required through the external power grid and operating costs of the cogenerator and the heat generator is maximized (S706).

In the control step (S706), the operating cost of the cogenerator may be calculated such that a power generation cost calculated by dividing the power supply amount of the cogenerator by power generation efficiency and multiplying the quotient by the first fuel price is included. Also, the operating cost of the heat generator may be calculated such that a heat production cost calculated by dividing the heat supply amount of the heat generator by heat production efficiency and multiplying the quotient by the second fuel price is included.

The price of the power supplied from the external power grid may vary in real time. Also, in the control step (S706), the complex energy system may perform calculation such that the target function value is maximized in consideration of a real-time price of the power supplied from the external power grid.

Also, in the control step (S706), the power supply amount and the heat supply amount of the cogenerator may be calculated by using a certain relationship. For example, when the power supply amount of the cogenerator is determined, the heat supply amount may be calculated according to a certain relational expression or a certain mapping rule.

The energy consumer may include a plurality of energy customers and may be a small complex energy system that implements an independent energy pricing policy for each of the plurality of energy customers.

Similarly to the external power grid, the complex energy system may be supplied with heat from an external heat network and may reversely supply the heat to the external heat network. In this case, in the control step (S706), the complex energy system may enable the sum of the power supply amount of the cogenerator and the power consumption amount from the external power grid to be equal to the total power consumption amount of the energy consumers. Also, the complex energy system may enable the sum of the heat supply amount of the cogenerator, the heat supply amount of the heat generator, and the heat consumption amount from the external heat network to be equal to the total heat consumption amount of the energy consumers. Also, the complex energy system may control the cogenerator and the heat generator so that the target function value obtained by subtracting the total energy consumption cost from the sum of the operating costs of the cogenerator and the heat generator, the power consumption cost from the external power grid, and the heat consumption cost from the external heat network is maximized.

Figure 8:
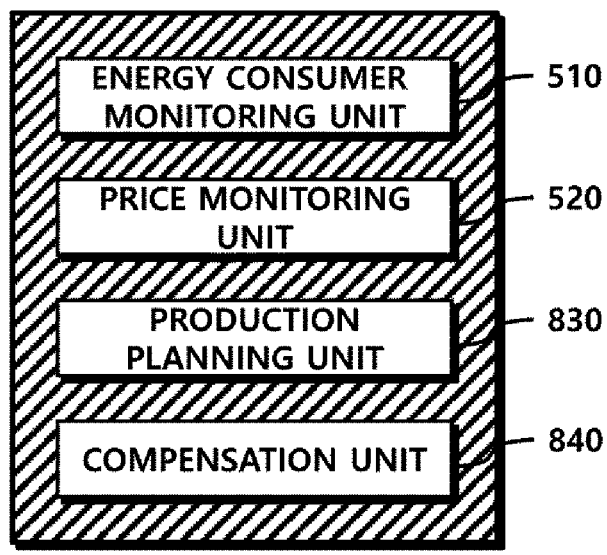
FIG. 8 is a block diagram of an energy management apparatus according to another embodiment.

FIG. 8 is a block diagram of an energy management apparatus according to another embodiment.

Referring to FIG. 8, an energy management apparatus 800 may include an energy consumer monitoring unit 510, a price monitoring unit 520, a production planning unit 830, and a compensation unit 840.

The energy consumer monitoring unit 510 may monitor energy consumption information for each energy consumer. The energy consumption information may include information regarding a heat usage amount, a heat production amount, a power usage amount, and a power production amount of each energy consumer. A meter for distinguishing and measuring the heat usage amount, the heat production amount, the power usage amount, and the power production amount may be installed in each of the energy consumers, and the energy consumer monitoring unit 510 may acquire energy consumption information for each energy consumer from the meter.

The price monitoring unit 520 may confirm an energy price applied to each energy consumer. The energy price may separately include a price for the heat usage amount, a price for the heat production amount, a price for the power usage amount, and a price for the power production amount. For example, different prices may be applied to the same heat usage amount and the same heat production amount.

The production planning unit 830 may calculate a heat production amount and a power production amount using user information and supplier information.

Here, the user information may include power usage information, power production information, heat usage information, and heat production information acquired from the energy consumer monitoring unit 510.

The supplier information may include power price information, heat supply price information, and fuel price information. Also, the supplier information may include heat power supply facility capacity information indicating a capacity of the energy production apparatus 410 and may include operation modeling information regarding an element of the energy production apparatus 410.

Here, the operation modeling information may be information that is calculated and stored by design or measurement and may have a form of a relational equation or a look-up table for an input or output of individual energy.

The compensation unit 840 may compensate for a power production amount and a heat production amount of the energy producer-consumer 120a. A structure in which heat and power produced by individual households as well as only the complex energy supply apparatus 110 may be sold is established through the compensation process.

The compensation unit 840 may compensate for a power production amount and a heat production amount of the energy producer-consumer 120a according to predetermined compensation policy information.

The compensation policy information may be determined according to a supply energy agreement for each household. Constituents of the energy producer-consumer 120a and a manager of the complex energy supply apparatus 110 may agree to a contract including a transaction price associated with supply and consumption of power for each household, a contract about a transaction price associated with supply and consumption of heat for each household, and a contract about a method of receiving compensation when energy (heat and power) generated for each household is reversely supplied to the complex energy supply apparatus 110 or the heat network. The contents of the contracts are digital information and may be included in the above-described compensation policy information.

The compensation policy information may include compensation information regarding a power production amount and a heat production amount for each time period. The compensation unit 840 may determine an amount of compensation for the power production amount and the heat production amount produced for each time period according to the compensation information. An amount of compensation may be directly delivered to a corresponding household in some cases or when a charge for the corresponding household is reduced and exempted according to the amount of compensation during a post-settlement.

The compensation policy information may include usage replacement information obtained by replacing a power usage amount of a first time period with a power production amount of a second time period or replacing a heat usage amount of a third time period with a heat production amount of a fourth time period. The compensation unit 840 may enable a household to compensate for heat or power on a different time or day desired by the household for heat or power produced using the usage replacement information.

The compensation policy information may include usage replacement information obtained by replacing the power usage amount with the heat production amount according to a certain rate or replacing the heat usage amount with the power production amount according to a certain rate. The compensation unit 840 may use the usage replacement information to replace the power usage amount with the heat production amount and also replace the heat usage amount with the power production amount. As a detailed example, a user may be burdened with a power usage amount at a power price peak time period, and the compensation unit 840 may replace the power usage amount at the power price peak time period with the heat production amount. However, the compensation unit 840 may replace the power usage amount at the power price peak time period with a heat production amount at a heat supply price peak time period or a fuel price peak time period so as to be beneficial to a supplier. Here, the power price peak time period may be indicated for each day or season, and the fuel supply price peak time period may be indicated for each season.

The compensation policy information may include price-linked compensation information that is used to determine a different amount of compensation depending on a heat supply price or a power supply price. The compensation unit 840 may determine a different compensation price for the heat production amount according to a heat supply price and a different compensation price for the power production amount according to a power price by using the price-linked compensation information.

The production planning unit 830 may be equipped with an energy management algorithm, and the energy management algorithm may use the compensation policy information in addition to the supplier information to calculate a heat production amount and a power production amount such that the user and the supplier may gain benefits.

$$\min\left\{\sum_{i=1}^{\substack{household \\ number}} (\text{electricity cogeneration cost} + \text{heat cogeneration cost} + \text{boiler heat generation cost} + \text{grid electricity purchase cost} - \text{grid electricity reverse-supply cost}) + \sum_{i=1}^{\substack{facility \\ number}} (\text{household electricity reverse-supply compensation cost} + \text{household heat reverse-supply compensation cost})\right\} \quad [\text{Equation (7)}]$$

Equation (7) is an example of a formula that is used by the production planning unit 830 to determine the heat production amount and the power production amount.

In Equation (7), a power cogeneration cost and a heat cogeneration cost are costs that are required to produce power and heat through cogeneration, a boiler heat generation cost is a cost that is required to produce heat through a boiler, and a grid electricity purchase cost is a power purchase cost that is required to purchase and supply power to the power network. In Equation (7), a grid electricity reverse-supply cost is a benefit that is gained when surplus power of the power network is sold to the grid, a household electricity reverse-supply compensation cost is a compensation cost for a power production amount of the energy producer-consumer 120a, and a household heat reverse-supply compensation cost is a compensation cost for a heat production amount of the energy producer-consumer 120a.

The production planning unit 830 may determine a heat production amount and a power production amount in order to minimize Equation (7).

When the heat production amount and the power production amount are determined by the production planning unit 830, the energy management apparatus 800 may generate a control signal that may change an output of the energy production apparatus 410 or that may deliver an on/off operating instruction to some facilities and may transmit the generated control signal to the energy production apparatus 410. A process of generating a control signal using user information, supplier information, and compensation policy information may be repeated at minimum intervals of 5 minutes.

FIG. 9 is a flowchart of an energy management method according to another embodiment.

A flow of the method will be described below in a certain order. However, the present invention is not limited to the order. The order may be changed and applied according to an implementation of the present invention.

Referring to FIG. 9, the energy management apparatus 800 acquires power price information, heat supply price information, and fuel price information for each time period (S900).

Also, the energy management apparatus 800 acquires power usage information and heat usage information from an energy consumer and acquires power production information and heat production information from an energy producer-consumer that autonomously produces heat and power through the complex private power generator (S902).

Also, the energy management apparatus 800 confirms heat power supply facility capacity information and operation modeling information for constituents (S904) and confirms contract information corresponding to compensation policy information (S906).

After acquiring the above-described information (e.g., user information and supplier information) to be applied to an energy management algorithm, the energy management apparatus 800 calculates a heat production amount and a power production amount using the above-described information (S908).

Also, the energy management apparatus 800 generates a control signal for the calculated heat production amount and power production amount and transmits the generated control signal to the energy production apparatus 410 (S910).

The above-described embodiments may have advantages with respect to an inventive approach that induces an optimization solution in consideration of a price that actually changes in real time and a bidirectional energy flow that reflects all of different pricing systems, consumption factors, and production factors of the energy consumers. Also, the embodiments have advantages in which when the optimization solution is used, optimization calculation may be applied even to a case in which a transaction of energy generation amounts of different types of energy is made according to a contract between an energy supplier and an energy consumer. That is, even when compensation is made by supplying thermal energy when power is produced and supplying electric energy when the thermal energy is produced, a charge coefficient associated with consumption and production of power and heat is independently reflected for each energy consumer as shown in Equation (4). Thus, all individual contracts may be considered.

According to the embodiments, the energy consumer and the energy supplier can make a bidirectional transaction of heat and power. Also, according to the embodiments, when an energy supplier for supplying heat (including cooling and heating) and power supplies energy to an energy consumer, the energy can flow bidirectionally between the energy supplier and the energy consumer rather than unidirectionally from the energy supplier to the energy consumer, unlike the existing energy flow.

Also, according to the embodiments, over an energy network through which energy flows bidirectionally, an energy supplier can flexibly perform an operation of supplying heat and power in consideration of heat and power produced by energy consumers. In this case, a solution of purchasing the heat and power of the energy consumers can also be included.

Also, according to the embodiments, an energy supplier can supply energy such that a gain is obtainable from the energy supplier according to a format required by an energy user of an energy consumer in complex connection with power, heat, fuel, and demand information. The terms "comprise," "configure," and/or "having," when used in this specification, specify the presence of stated elements, but do not preclude the presence or addition of one or more other elements, unless otherwise defined. Unless otherwise defined, all terms (including technical and scientific terms) used herein have the same meaning as commonly understood by one of ordinary skill in the art to which this invention belongs. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

The above-described subject matter of the present invention is to be considered illustrative and not restrictive, and it should be understood that numerous other modifications and embodiments can be devised by those skilled in the art that will fall within the spirit and scope of the principles of the present invention. Accordingly, the embodiments of the present invention are to be considered descriptive and not restrictive of the present invention, and do not limit the scope of the present invention. The scope of the invention should be defined by the appended claims, and all technical ideas within the scope of their equivalents should be construed as included in the scope of the invention.

What is claimed is:

1. A control method of a complex energy system that supplies heat and power to a plurality of energy consumers through a heat network and a power network, the complex energy system includes an energy production apparatus that supplies heat and power to the plurality of energy consumers, the control method comprising:

monitoring with an energy management apparatus bidirectional transactions of power and heat between the energy production apparatus and the plurality of consumers who are also producers of power and heat;

monitoring with the energy management apparatus energy consumption information of the plurality of energy consumers and confirming an energy price applied to each of the plurality of energy consumers;

calculating with the energy management apparatus a total energy consumption cost of the plurality of energy consumers according to the energy price and the energy consumption information, a consumer power consumption cost is calculated to be different from a consumer power production cost, and a consumer heat consumption cost is calculated to be different from a consumer heat production cost; and controlling with an energy production apparatus a cogenerator and a heat generator so that a sum of a power supply amount of the cogenerator and a power consumption amount from an external power grid is equal to a total power consumption amount of the plurality of energy consumers, a sum of a heat supply amount of the cogenerator and a heat supply amount of the heat generator is equal to a total heat consumption amount of the plurality of energy consumers, and a target function value obtained by subtracting the total energy consumption cost from a sum of the power consumption cost from the external power grid and operating costs of the cogenerator and the heat generator is maximized;

wherein the bidirectional transactions include cross-direction transactions between heat and power such that the energy production apparatus can receive heat from the plurality of energy consumers instead of selling electricity, or can supply electricity instead of selling heat.

2. The control method of claim 1, wherein:
the energy consumption information includes information regarding a heat usage amount, a heat production amount, a power usage amount, and a power production amount of the energy consumer; and
the energy price separately includes a price for the heat usage amount, a price for the heat production amount, a price for the power usage amount, and a price for the power production amount.

3. The control method of claim 2, wherein the energy price varies depending on an energy consumption amount of each energy consumer.

4. The control method of claim 1, further comprising confirming a first fuel price of first fuel supplied to the cogenerator and a second fuel price of second fuel supplied to the heat generator, wherein
the controlling of the cogenerator and the heat generator comprises:
calculating the operating cost of the cogenerator such that a power generation cost calculated by dividing the power supply amount of the cogenerator by power generation efficiency and multiplying the quotient by the first fuel price is included; and
calculating the operating cost of the heat generator such that a heat production cost calculated by dividing the heat supply amount of the heat generator by heat production efficiency and multiplying the quotient by the second fuel price is included.

5. The control method of claim 1, wherein:
a price of power supplied from the external power grid or power reversely supplied to the external power grid varies in real time based on a system marginal price (SMP); and
the controlling of the cogenerator and the heat generator comprises performing a calculation operation in consideration of the SMP such that the target function value is maximized.

6. The control method of claim 1, wherein the controlling of the cogenerator and the heat generator comprises calculating the power supply amount and the heat supply amount of the cogenerator by using a certain relationship.

7. The control method of claim 1, wherein the energy consumer includes a plurality of energy customers and an independent energy pricing policy is implemented for each of the plurality of energy consumers.

8. The control method of claim 1, wherein the target function is expressed by Equation (1) under Restrictive Condition 1 and Restrictive Condition 2, Target function =
$$\mathrm{Max}\left\{\sum_{i=1}^{n}\left[(Ce\text{-}l\text{-}i)\cdot(Pe\text{-}l\text{-}i)-(Ce\text{-}g\text{-}i)\cdot(Pe\text{-}g\text{-}i)+\right.\right.$$
$$(Ct\text{-}l\text{-}i)\cdot(Pt\text{-}l\text{-}i)-(Ct\text{-}g\text{-}i)\cdot(Pt\text{-}g\text{-}i)]-$$
$$\left[Cgas\left(\frac{Pe\text{-}chp}{\eta e}\right)+Cgas\left(\frac{Pt\text{-}bo}{\eta bo}\right)+\right.$$
$$\left.\left.(Ce\text{-}b\cdot Pe\text{-}b)-(Ce\text{-}s\cdot Pe\text{-}s)\right]\right\}$$

Equation (1)

[Restrictive Condition 1]

$$(Pe\text{-}chp)+(Pe\text{-}b)-(Pe\text{-}s)=\sum_{i=1}^{n}(Pe\text{-}l\text{-}i)-\sum_{i=1}^{n}(Pe\text{-}g\text{-}i)$$

[Restrictive Condition 2]

$$(Pt\text{-}chp)+(Pt\text{-}bo)=\sum_{i=1}^{n}(Pt\text{-}l\text{-}i)-\sum_{i=1}^{n}(Pt\text{-}g\text{-}i)$$

wherein:
Ce-I-i, Ce-g-i, Ct-I-i, and Ct-g-n are a price for a power usage amount, a price for a power production amount, a price for a heat usage amount, and a price for a heat production amount that are applied to an ith energy consumer (i is a natural number), respectively;
Pe-I-i, Pe-g-i, Pt-I-n, and Pt-g-i are an energy consumer power usage amount, an energy consumer power production amount, an energy consumer heat usage amount, and an energy consumer heat production amount that are monitored through a meter of the ith energy consumer (i is a natural number), respectively;
Pe-chp is the power supply amount of the cogenerator, Pt-bo is the heat supply amount of the heat generator, ne is the power generation efficiency of the cogenerator, nbo is the heat production efficiency of the heat generator, and Cgas is a fuel price; and
Pe-b is a power amount supplied from the external power grid, Ce-b is a price of Pe-b, Pe-s is a power amount reversely supplied to the external power grid, and Ce-s is a price of Pe-s.

9. A complex energy system that supplies heat and power to a plurality of energy consumers through a heat network and a power network, the complex energy system comprising:
an energy production apparatus including a cogenerator and a heat generator;
an energy management apparatus configured to:
monitor bidirectional transactions of power and heat between the energy production apparatus and the plurality of energy consumers who are also producers of power and heat;
monitor energy consumption information of the plurality of energy consumers;
confirm an energy price applied to each of the plurality of energy consumers and confirm a first fuel price of first fuel supplied to the cogenerator, a second fuel price of second fuel supplied to the heat generator, and a power consumption price from an external power grid;

calculate a total energy consumption cost of the plurality of energy consumers according to the energy price and the energy consumption information, a consumer power consumption cost is calculated to be different from a consumer power production cost, and a consumer heat consumption cost is calculated to be different from a consumer heat production cost; and wherein the energy production apparatus is configured to control the cogenerator and the heat generator so that a sum of a power supply amount of the cogenerator and a power consumption amount from the external power grid is equal to a total power consumption amount of the plurality of energy consumers, a sum of a heat supply amount of the cogenerator and a heat supply amount of the heat generator is equal to a total heat consumption amount of the plurality of energy consumers, and a target function value obtained by subtracting the total energy consumption cost from a sum of the power consumption cost from the external power grid and operating costs of the cogenerator and the heat generator is maximized;

wherein the bidirectional transactions include cross-direction transactions between heat and power such that the energy production apparatus can receive heat from the plurality of energy consumers instead of selling electricity, or can supply electricity instead of selling heat.

10. The complex energy system of claim 9, wherein a control unit of the energy management apparatus generates control values for the cogenerator and the heat generator at regular intervals of 5 minutes or less.

11. The complex energy system of claim 9, wherein:
a price of power supplied from the external power grid (an external power grid power consumption price) is different from a price of power reversely supplied to the external power grid (an external power grid power reverse-supply price);
a price for a power usage amount of the energy consumer (an energy consumer power consumption price) is different from a price for a power production amount of the energy consumer (an energy consumer power reverse-supply price); and
the energy consumer power reverse-supply price is set to be lower than the external power grid power reverse-supply price.

12. A control method of a complex energy system that supplies heat and power to a plurality of energy consumers through a heat network and a power network, the complex energy system includes an energy production apparatus that supplies heat and power to the plurality of energy consumers, the control method comprising:

monitoring with an energy management apparatus bidirectional transactions of power and heat between the energy production apparatus and the plurality of energy consumers who are also producers of power and heat;

monitoring with the energy management apparatus energy consumption information of the plurality of energy consumers and confirming an energy price applied to each of the plurality of energy consumers;

calculating with the energy management apparatus a total energy consumption cost of the plurality of energy consumers according to the energy price and the energy consumption information, a consumer power consumption cost is calculated to be different from a consumer power production cost, and a consumer heat consumption cost is calculated to be different from a consumer heat production cost; and controlling with an energy production apparatus a cogenerator and a heat generator so that a sum of a power supply amount of the cogenerator and a power consumption amount from an external power grid is equal to a total power consumption amount of the plurality of energy consumers, a sum of a heat supply amount of the cogenerator, a heat supply amount of the heat generator, and a heat consumption amount from an external heat network is equal to a total heat consumption amount of the plurality of energy consumers, and a target function value obtained by subtracting the total energy consumption cost from a sum of the power consumption cost from the external power grid, the heat consumption cost from the external heat network, and operating costs of the cogenerator and the heat generator is maximized;

wherein the bidirectional transactions include cross-direction transactions between heat and power such that the energy production apparatus can receive heat from the plurality of energy consumers instead of selling electricity, or can supply electricity instead of selling heat.

13. The control method of claim 12, wherein:
the energy consumption information includes information regarding a heat usage amount, a heat production amount, a power usage amount, and a power production amount of the energy consumer; and
the energy price separately includes a price for the heat usage amount, a price for the heat production amount, a price for the power usage amount, and a price for the power production amount.

14. The control method of claim 13, wherein the energy price varies depending on an energy consumption amount of each energy consumer.

15. The control method of claim 12, wherein an independent energy pricing policy is implemented for each of the plurality of energy consumers.

* * * * *